US012737028B2

(12) United States Patent
Isola et al.

(10) Patent No.: US 12,737,028 B2
(45) Date of Patent: Sep. 15, 2026

(54) COMPUTER SYSTEM HAVING A DEEP SLEEP MODE

(71) Applicant: STMicroelectronics (Grenoble 2) SAS, Grenoble (FR)

(72) Inventors: Philippe Isola, Grenoble (FR); Olivier Sauvage, Tullins (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 104 days.

(21) Appl. No.: 18/832,431

(22) PCT Filed: Jan. 18, 2023

(86) PCT No.: PCT/FR2023/050068
§ 371 (c)(1),
(2) Date: Jul. 23, 2024

(87) PCT Pub. No.: WO2023/139330
PCT Pub. Date: Jul. 27, 2023

(65) Prior Publication Data

US 2025/0103127 A1 Mar. 27, 2025

(30) Foreign Application Priority Data

Jan. 24, 2022 (FR) ...................................... 2200576

(51) Int. Cl.
*G06F 1/32* (2019.01)
*G06F 1/3234* (2019.01)

(52) U.S. Cl.
CPC ................................. *G06F 1/3234* (2013.01)

(58) Field of Classification Search
CPC ................ G06F 1/32; G06F 9/44; G06F 1/12
See application file for complete search history.

(56) References Cited

U.S. PATENT DOCUMENTS 10,664,039 B2 * 5/2020 Herdrich ................ G06F 13/24
2010/0325391 A1 * 12/2010 Talla .................... G06F 13/362 712/31
2013/0073884 A1 3/2013 Ulmer et al.
2016/0026507 A1 * 1/2016 Muckle ................ G06F 9/5094 718/104
2021/0157382 A1 5/2021 Rangarajan et al.

* cited by examiner

*Primary Examiner* — Keshab R Pandey
(74) *Attorney, Agent, or Firm* — Slater Matsil, LLP

(57) ABSTRACT

An example computer system includes at least two processors, a power supply controller, configuration registers, and a wake-up circuit. The computer system has a deep sleep mode in which the processors are not supplied with power. The power supply controller is configured to detect events of different types to be processed in the processors in the deep sleep mode. The configuration registers are configured to assign the processing to the different processors according to the type of event detected. The wake-up circuit is configured to disable deep sleep mode after an event is detected, and activate, when disabling deep sleep mode, a power supply of one of the at least two processor to which the processing of the detected event has been assigned according to the configuration registers. The activation of the power supply powering on one of the processors, which is configured to process the detected event.

20 Claims, 2 Drawing Sheets

[Fig 1]
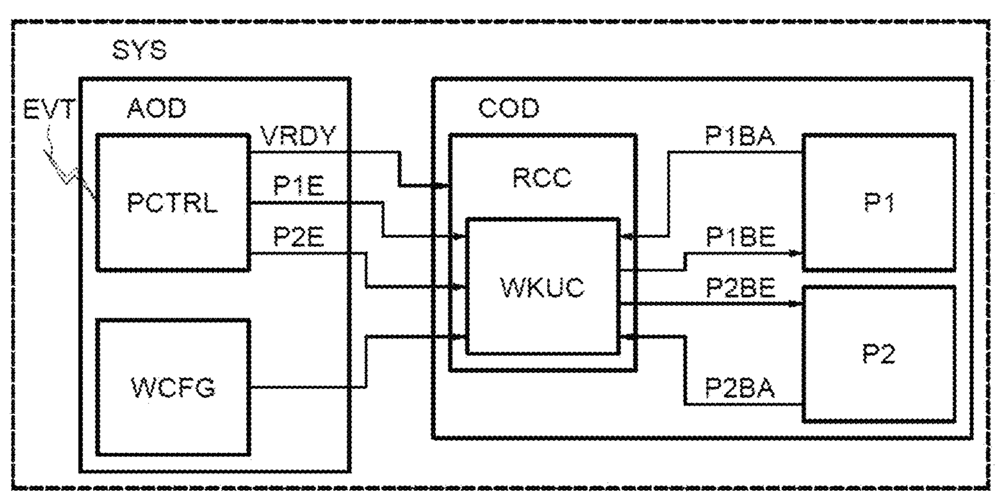
[Fig 2]
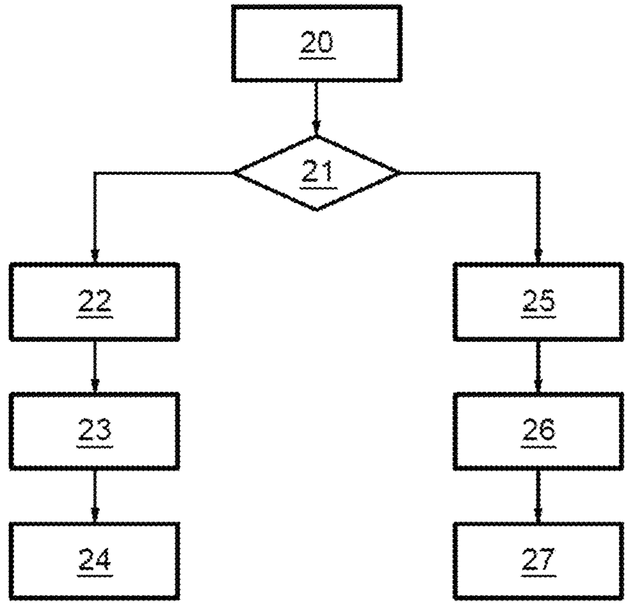

[Fig 3]
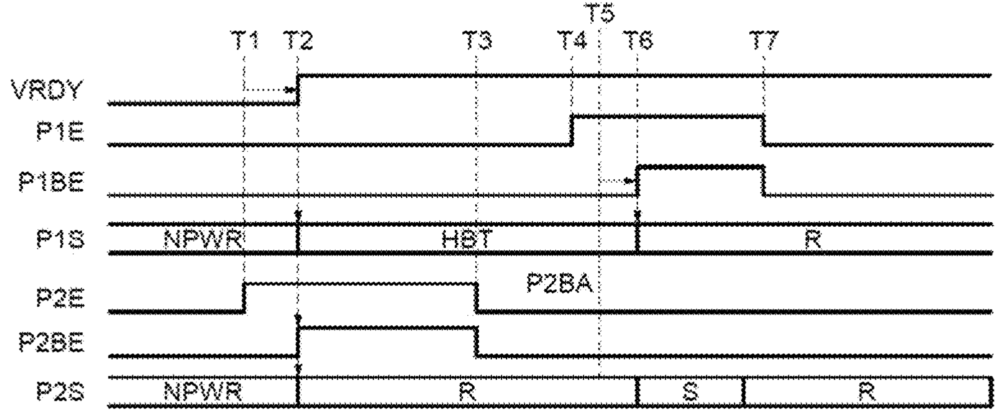
[Fig 4]
T1
T2
T3
T4
T5
T6
T7
VRDY
P1E
P1BE
P1S
NPWR
HBT
WFBEN
R
P2E
P2BA
P2BE
P2S
NPWR
R
S
R
[Fig 5]
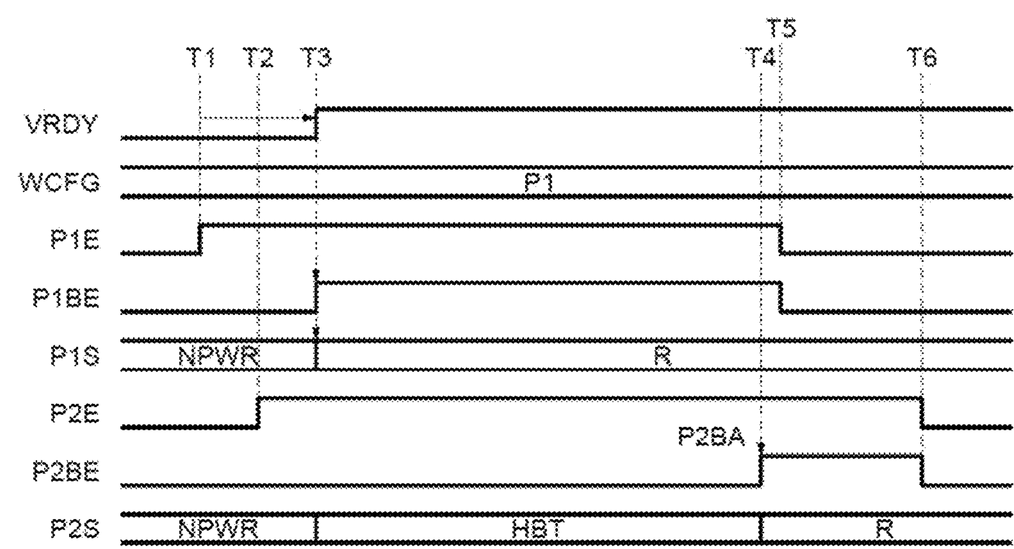

COMPUTER SYSTEM HAVING A DEEP SLEEP MODE

CROSS-REFERENCE TO RELATED APPLICATIONS

This application is a national stage application of International Application No. PCT/FR2023/050068, filed on Jan. 18, 2023, which claims priority to French Patent Application No. 2200576, filed on Jan. 24, 2022, which applications are hereby incorporated herein by reference.

TECHNICAL FIELD

Embodiments and implementations relate to computer systems, particularly systems on chip, including a plurality of processors and having a deep sleep mode in which the processors are not supplied with power.

BACKGROUND

Some computer systems are multiprocessors. These computer systems comprise a plurality of processors. These processors can be integrated into the same integrated circuit, for example into a microcontroller. Each processor may comprise one or more cores. The processors can be used to serve different tasks/applications that are dedicated thereto. In particular, in a dual-processor computer system, a first processor, known as main processor, can be used to execute a non-real time operating system and a second processor, known as auxiliary processor, can be used to execute a real-time operating system. The main processor and the auxiliary processor are each configured to process tasks that are dedicated thereto. In particular, the computer system may detect events that are to be processed either by the main processor or by the auxiliary processor. The auxiliary processor makes it possible to relieve the main processor of certain tasks requiring fast processing. The main processor then operates as master and the auxiliary processor operates as slave.

Moreover, a multiprocessor computer system can be configured to have different power supply modes. In particular, such a computer system may comprise as power supply mode a normal operating mode and a deep sleep mode. The normal operating mode makes it possible to power each processor so that it can execute the tasks that are assigned thereto. Deep sleep mode makes it possible to stop supplying power to most of the elements of the computer system. In particular, deep sleep mode makes it possible to stop supplying power to all of the processors when they have no tasks to execute, as well as to the memories and to the logic circuits of the computer system for example. This deep sleep mode therefore makes it possible to reduce an energy consumption of the computer system when the processors are not used. More particularly, this deep sleep mode makes it possible to consume even less energy than a low consumption mode in which the power supply of the computer system is maintained and in which clock generators of the computer system are simply deactivated.

The computer system is configured to be able to disable deep sleep mode based on the detection of events of which the processing requires the use of one of the processors. These events may for example be interrupt requests (IRQ).

In particular, the detection of an event makes it possible to wake up the main processor used for executing the non-real time operating system. Once woken up, the main processor is configured to initialise the computer system, particularly in terms of security and clocks. Then, once the computer system has been initialised, the main processor is configured to process the event if the processing of this event is assigned thereto or to wake up the auxiliary processor that is assigned to the processing of the event.

Thus, the processing of an event assigned to an auxiliary processor firstly requires waking up the main processor allowing the computer system to be initialised before the auxiliary processor is able to process the event that is dedicated thereto. The processing of an event dedicated to an auxiliary processor may then not be sufficiently reactive for a real-time application. Consequently, a user may prefer to avoid using deep sleep mode to allow real-time processing of the events by the auxiliary processor. The fact of not using deep sleep mode does not make it possible to reduce the energy consumption of the computer system, which may have a limited autonomy.

Furthermore, the main processor generally consumes a lot of energy in relation to the auxiliary processor. Thus, the fact of waking up the main processor first so that the auxiliary processor can process events that are assigned thereto induces an unnecessary consumption of energy.

Therefore, there is a need to propose a computer system making it possible to rapidly process events detected while the computer system is in deep sleep mode.

SUMMARY

According to one aspect, a computer system is proposed comprising at least two processors, the computer system having a deep sleep mode in which the processors are not supplied with power, a power supply controller configured to detect events of different types that require processing by said at least two processors when the computer system is in deep sleep mode, configuration registers configured to assign the processing of each event detected by the power supply controller to the different processors according to the type of event detected, a wake-up circuit configured to disable deep sleep mode after an event is detected by the power supply controller, the wake-up circuit being configured to activate, when disabling deep sleep mode, a power supply of the processor to which the processing of the detected event has been assigned according to said configuration registers, this processor then being configured to process the detected event.

Thus, in such a computer system, each processor can be woken up directly after being placed in deep sleep mode if the processing of the detected event is assigned thereto. Such a computer system makes it possible to process the detected events more rapidly when the computer system is in deep sleep mode. Consequently, such a computer system is suitable for using a deep sleep mode while remaining efficient within the scope of real-time applications. By using deep sleep mode, the computer system can reduce its energy consumption. In this way, an autonomous computer system, that is to say powered by a battery, can increase its autonomy.

In an advantageous embodiment, the configuration registers are configured to define the processor to wake up first in the event of simultaneous detection of events of which the processing is assigned to different processors.

Preferably, the processor woken up by the wake-up circuit when disabling deep sleep mode is configured to initialize the computer system.

Advantageously, the processor woken up by the wake-up circuit when disabling deep sleep mode is configured to authorize an activation of a power supply of each other processor after having initialized the computer system.

In an advantageous embodiment, the computer system is a microcontroller.

According to another aspect, a management method is proposed for disabling a deep sleep mode of a computer system including at least two processors, that are not supplied with power during said deep sleep mode, the method including detecting at least one event of a certain type that requires processing by one at least of said at least two processors when the computer system is in deep sleep mode, then assigning the processing of each detected event to the different processors according to the type of event detected, then activating, when disabling deep sleep mode, a power supply of a processor to which the processing of a detected event has been assigned, then a processing of this detected event by this processor.

In an advantageous implementation, the method further comprises, in the event of simultaneous detection of events of which processing is assigned to different processors, reading a configuration indicating the processor to be woken up first from said different processors when disabling deep sleep mode.

Preferably, the processor woken up when disabling deep sleep mode initializes the computer system.

Advantageously, the processor woken up when disabling deep sleep mode authorizes an activation of a power supply of each other processor after having initialized the computer system.

BRIEF DESCRIPTION OF THE DRAWINGS

Other advantages and features of the invention will become apparent upon examination of the detailed description of non-limiting implementations and embodiments, and of the appended drawings, wherein:

FIG. 1 illustrates an embodiment of a computer system SYS. The computer system SYS may be a microcontroller;

FIG. 2 illustrates a method for processing events that can be implemented by the computer system of FIG. 1;

FIG. 3 illustrates a first example of implementation of the method;

FIG. 4 illustrates a second example of implementation of the method; and

FIG. 5 illustrates a third example of implementation of the method in which two events are detected simultaneously.

DETAILED DESCRIPTION OF ILLUSTRATIVE EMBODIMENTS

FIG. 1 illustrates an embodiment of a computer system SYS. The computer system SYS may be a microcontroller.

The computer system SYS includes two power domains AOD, COD. A first domain, known as power control domain AOD, is configured to be powered constantly. A second domain, known as computing domain COD, is configured to be or not be powered according to a desired power supply mode. In particular, the computer system includes a deep sleep mode. This deep sleep mode is a power supply mode making it possible to stop the power supply of the second domain, known as computing domain COD, while maintaining the power supply of the power control domain AOD. This deep sleep mode makes it possible to reduce the energy consumption of the computer system SYS. In particular, deep sleep mode makes it possible to stop supplying power to most of the elements of the computer system SYS. Deep sleep mode thus makes it possible to also stop supplying power to the memories (not shown) as well as to the logic circuits (not shown) of the computer system SYS for example.

The computing domain COD includes two processors P1 and P2. The computer system SYS is therefore a multiprocessor system. The processor P1 may operate at a frequency different from that of the processor P2. Each processor P1, P2 may comprise one or more cores. The processors are used to serve different tasks/applications that are dedicated thereto. In particular, the first processor P1 can be configured to execute a non-real time operating system. The first processor P1 is then the main processor. The second processor P2 can be configured to execute a real-time operating system. The second processor P2 is then an auxiliary processor.

Here, the computing domain COD only includes two processors. Nevertheless, it is possible to provide a computing domain COD including more than two processors.

The processors P1 and P2 are not powered when the computer system SYS is configured in its deep sleep mode. When they are not powered, the processors P1 and P2 are said to be asleep. When the computer system SYS is disabled from deep sleep mode and the processors P1 and P2 are once again powered, the processors P1 and P2 are said to be awake.

The processors P1 and P2 are configured to process events EVT that can be detected by the computer system SYS. These events may be of several types. For example, events may be signals coming from sensors connected to the computer system, or signals corresponding to detection of a computer attack on the computer system.

In particular, the power control domain AOD comprises a power supply controller PCTRL. The power supply of this power supply controller PCTRL is maintained constantly, particularly when the computer system is configured in deep sleep mode.

The power supply controller PCTRL is configured to detect events EVT that require processing by the processor P1 or by the processor P2.

The power control domain AOD comprises configuration registers WCFG allowing the processors P1 or P2 to be assigned to the processing of the different types of events that may be detected. For example, the processing of the signals coming from sensors connected to the computer system may be assigned to the auxiliary processor P2 and the processing of the signals corresponding to detection of a computer attack may be assigned to the main processor P1.

The configuration registers WFCG can also define which processor P1 or P2 to wake up first in the case of simultaneous detection of a plurality of events of which the processing is assigned to the different processors P1 and P2, when the computer system is configured in deep sleep mode. Thus, only one processor is woken up first when disabling deep sleep mode.

The computing domain COD also includes a reset and clock controller RCC. The power supply controller PCTRL and the configuration registers WCFG are connected to the reset and clock controller RCC of the computing domain COD.

The reset and clock controller RCC comprises a wake-up circuit WKUC configured to disable deep sleep mode. The wake-up circuit WKUC is configured to control the wake-up of the processors P1 and P2 when events of which the processing is assigned thereto have been detected by the power supply controller PCTRL. The wake-up of the processors P1 and P2 makes it possible for the processors P1 and P2 to carry out the processing of detected events.

In particular, the power supply controller PCTRL is configured to deliver different signals to the reset and clock controller RCC. More particularly, the power supply controller PCTRL is configured to deliver a signal VRDY to the reset and clock controller RCC.

The power supply controller PCTRL is also configured to deliver signals PIE and P2E to the wake-up circuit WKUC. The signal PIE is generated when the power supply controller PCTRL detects an event that requires processing by the processor P1. The signal PIE thus makes it possible to indicate to the wake-up circuit WKUC that the processor P1 should be woken up so that the latter can process the detected event. The signal P2E is generated when the power supply controller PCTRL detects an event that requires processing by the processor P2. The signal P1E thus makes it possible to indicate to the wake-up circuit WKUC that the processor P1 should be woken up so that the latter can process the detected event.

The wake-up circuit WKUC is configured to deliver to the processor P1 a signal P1BE when it receives the signal P1E generated by the power supply controller PCTRL. This signal P1BE makes it possible to indicate to the processor P1 that an event that requires its processing has been detected. The processor P1 is then configured to process the detected event. In particular, if the processor P1 is the first woken up when disabling deep sleep mode, the processor P1 is configured to initialise the computer system SYS first. When the processor P1 is the first processor to be woken up when disabling deep sleep mode, the processor P1 is configured to deliver a signal P1BA once the computer system SYS has been initialised.

The wake-up circuit WKUC is also configured to deliver to the processor P2 a signal P2BE when it receives the signal P2E generated by the power supply controller PCTRL. This signal P2BE makes it possible to indicate to the processor P2 that an event that requires its processing has been detected. The processor P2 is then configured to process the detected event. In particular, if the processor P2 is the first woken up when disabling deep sleep mode, the processor P2 is configured to initialise the computer system SYS first. When the processor P2 is the first processor to be woken up when disabling deep sleep mode, the processor P2 is configured to deliver a signal P2BA once the computer system SYS has been initialised.

In such a computer system SYS, each processor P1, P2 can be woken up directly after being placed in deep sleep mode if the processing of the detected event is assigned thereto. Such a computer system makes it possible to process the detected events more rapidly when the computer system SYS is in deep sleep mode. Consequently, such a computer system SYS is suitable for using a deep sleep mode while remaining efficient for the real-time applications. By using deep sleep mode, the computer system SYS can reduce its energy consumption. In this way, an autonomous computer system can increase its autonomy. Furthermore, in such a computer system SYS, when the power supply controller PCTRL detects an event of which the processing is assigned to the auxiliary processor P2, the computer system SYS does not need to unnecessarily activate the main processor P1 first, because the auxiliary processor itself takes care of initialising the computer system SYS. Thus, the auxiliary processor becomes the master processor and the main processor becomes the slave processor when disabling from deep sleep mode. Waking up the auxiliary processor P2 first thus makes it possible to reduce the energy consumption when disabling deep sleep mode.

FIG. 2 illustrates a method for processing events that can be implemented by the computer system of FIG. 1. At the beginning of this method, the computer system is configured in deep sleep mode in which the processors P1 and P2 are not supplied with power. In other terms, the processors P1 and P2 are asleep at the beginning of the method for processing events.

At step 20, the power supply controller detects at least one event. The power supply controller may detect only one event or a plurality of simultaneous events. The power supply controller then determines the type of each detected event. For each detected event, the power supply controller subsequently uses the configuration registers to find out which processor is configured to process this event. If the processing of a detected event is assigned to the processor P1, then the power supply controller emits a signal P1E. If the processing of a detected event is assigned to the processor P2, then the power supply controller emits a signal P2E. The power supply controller switches the power supply of the computing domain COD back on then emits the signal VRDY to alert the reset and clock controller RCC that the computer system can be disabled from deep sleep mode.

At step 21, the wake-up circuit receives the signal P1E and/or P2E.

If at step 21 the wake-up circuit simultaneously receives a signal PIE and a signal P2E, then the wake-up circuit goes to step 22 in which the wake-up circuit determines which processor to wake up first depending on the configuration saved in the configuration registers. If the configuration registers indicate that the processor P1 should be woken up first if simultaneous events are detected, then the wake-up circuit generates the signal P1BE to wake up the processor P1. If the configuration registers indicate that the processor P2 should be woken up first if simultaneous events are detected, then the wake-up circuit generates the signal P2BE to wake up the processor P2.

At step 21, if the wake-up circuit receives only one signal PIE or P2E, then the wake-up circuit goes to step 25 in which the wake-up circuit wakes up the processor to which the processing of signal P1E or P2E has been assigned. In particular, if the wake-up circuit has received the signal P1E, then the wake-up circuit wakes up the processor P1 by generating the signal P1BE. If the wake-up circuit has received the signal P2E, then the wake-up circuit wakes up the processor P2 by generating the signal P2BE.

Subsequently, at step 23 or 26, the processor woken up by the wake-up circuit WKUC initialises the computer system. For example, if the wake-up circuit WKUC has woken up the processor P1 by emitting the signal P1BE, then the processor P1 once woken up initialises the computer system SYS. If the wake-up circuit WKUC has woken up the processor P2 by emitting the signal P2BE, then the processor P2 once woken up initialises the computer system SYS. Once the computer system has been initialised, the processor P1 or P2 that has been woken up emits the signal P1BA or P2BA to indicate to the wake-up circuit WKUC that the computer system SYS has been initialised, then processes the received event.

If a plurality of events have been detected simultaneously at step 20, then the wake-up circuit WKUC may subsequently wake up at step 24 the processor still asleep once the signal P1BA or P2BA has been received by the wake-up circuit. The wake-up of this processor then makes it possible to process the event that has not yet been processed.

If only one event has been detected at step 20, the wake-up circuit WKUC may wake up at step 27 the processor still asleep once the signal P1BA or P2BA has been received by the wake-up circuit if the clock controller has subsequently detected a new event. The wake-up of this processor then makes it possible to process the newly received event.

FIG. 3 illustrates a first example of implementation of the method. At the beginning of this example, the computer system SYS is in deep sleep mode. The processors P1 and P2 are therefore not supplied with power (state NPWR). Subsequently, at the time T1, the power supply controller PCTRL detects a first event of which the processing is assigned to the processor P2. The power supply controller PCTRL then generates the signal P2E. The detection of the first event results in the activation of the power supply of the computing domain COD. The power supply controller PCTRL then delivers at the time T2 the signal VRDY to the reset and clock controller RCC in order to indicate to the latter that the processor P2 can be woken up. The wake-up circuit WKUC then generates the signal P2BE to wake up the processor P2, by supplying the processor P2 with power, so that the latter can process the first detected event. The signal P2BE is maintained until the end of the signal P2E at the time T3. Once the signal P2BE has been received, the processor P2 initialises the computer system SYS. The processor P2 subsequently processes the detected event (state R). Once the event has been processed, the processor P2 can be sent back to sleep again (state S). The processor P2 delivers the signal P2BA once the computer system SYS has been initialised at the time T5. The processor P1 cannot be woken up while the computer system SYS has not finished being initialised by the processor P2 (state HBT). In particular, here the power supply controller PCTRL detects a second event that requires processing by the processor P1 and thus generates a signal PIE at a time T4. The signal P1E is thus delivered to the wake-up circuit WKUC before the emission of the signal P2BA by the processor P2, and therefore before the end of the initialisation of the computer system SYS. The wake-up circuit WKUC waits for the emission of the signal P2BA to generate, at the time T6, the signal P1BE allowing the processor P1 to be powered so that it can start processing the second event (state R). The signal P1BE is maintained until the end of the signal PIE at the time T7.

FIG. 4 illustrates a second example of implementation of the method. At the beginning of this example, the computer system SYS is in deep sleep mode. The processors P1 and P2 are therefore not supplied with power (state NPWR). Subsequently, at the time T1, the power supply controller PCTRL detects a first event of which the processing is assigned to the processor P2. The power supply controller PCTRL then generates the signal P2E. The detection of the first event results in the activation of the power supply of the computing domain COD. The power supply controller PCTRL then delivers at the time T2 the signal VRDY to the reset and clock controller RCC in order to indicate to the latter that the processor P2 can be woken up. The wake-up circuit WKUC thus generates the signal P2BE to wake up the processor P2, by supplying the processor P2 with power, so that the latter can process the first detected event. The signal P2BE is maintained until the end of the signal P2E at the time T4. Once the signal P2BE has been received, the processor P2 initialises the computer system SYS. The processor P2 subsequently processes the detected event (state R). Once the event has been processed, the processor P2 can be sent back to sleep again (state S). The processor P2 is configured to deliver the signal P2BA once the computer system SYS has been initialised at the time T3. The wake-up circuit WKUC is then authorised to generate the signal P1BE at the time T5. Nevertheless, the power supply controller PCTRL has not yet detected events that require processing by the processor P1. Thus, the processor P1 is still awaiting a detection of such an event, and therefore is not supplied with power during this period (state WFBEN). At the time T6, the power supply controller PCTRL detects a second event that requires processing by the processor P1. As the signal P1BE is already generated by the wake-up circuit WKUC, the processor P1 can be powered to process the event (state R). The signal P1BE is maintained until the end of the signal PIE at the time T7.

FIG. 5 illustrates a third example of implementation of the method in which two events are detected simultaneously. In particular, at the beginning of this example, the computer system SYS is in deep sleep mode. The processors P1 and P2 are therefore not supplied with power (state NPWR). Subsequently, at the time T1, the power supply controller PCTRL detects a first event of which the processing is assigned to the processor P1, then detects at the time T2 a second event of which the processing is assigned to the processor P2. The detection of these two events is considered as simultaneous. The power supply controller PCTRL then generates the signal P1E then the signal P2E. The detection of the first event results in the activation of the power supply of the computing domain COD. The power supply controller PCTRL then delivers at the time T3 the signal VRDY to the reset and clock controller RCC. The wake-up circuit is then configured to determine which processor to wake up first, based on the information saved in the configuration registers. Here, the configuration registers WCFG indicate that the processor P1 is the processor to be executed first when the power supply controller detects two events that require processing by different processors. Thus, the wake-up circuit WKUC generates at the time T3 the signal P1BE to wake up the processor P1, by supplying the processor P1 with power, so that the latter can initialise the computer system SYS then process the first detected event (state R). The processor P1 is configured to deliver the signal P1BA once the computer system SYS has been initialised at the time T4. The processor P2 cannot be woken up while the computer system SYS has not finished being initialised by the processor P1 (state HBT). The wake-up circuit WKUC waits for the emission of the signal P1BA to generate, at the time T4, the signal P2BE allowing the processor P2 to be powered so that it can start processing the second event (state R). The signal P1BE is maintained until the end of the signal PIE at the time T5. The signal P2BE is maintained until the end of the signal P2E at the time T6.

The invention claimed is:

1. A computer system comprising:

at least two processors, the computer system having a deep sleep mode in which the processors are not supplied with power;

a power supply controller configured to detect events of different types that require processing by the at least two processors in response to the computer system being in deep sleep mode;

configuration registers, located in an always-on domain of the computer system that remains powered during deep sleep mode, configured to pre-assign the processing of each type of event detectable by the power supply controller to a respective one of the different processors; and a wake-up circuit configured to:

disable deep sleep mode after an event is detected by the power supply controller, and activate a power supply of one of the at least two processors to which the processing of the detected event has been assigned according to the configuration registers in response to disabling deep sleep mode, wherein the activation of the power supply powers on the one of the at least two processors, and wherein the powered-on processor is configured to process the detected event.

2. The computer system according to claim 1, wherein the configuration registers are further configured to define which of the at least two processors to wake up first in an event of simultaneous detection of multiple events by the power supply controller.

3. The computer system according to claim 1, wherein the one of the at least two processors that is powered on by the activation of the power supply is configured to initialize the computer system.

4. The computer system according to claim 3, wherein the one of the at least two processors that is powered on and initializes the computer system is further configured to authorize activation of a power supply for each of the other processors of the at least two processors after initializing the computer system.

5. The computer system according to claim 1, wherein the computer system is a microcontroller.

6. A method for managing a computer system including at least two processors, the method comprising:

operating the computer system in a deep sleep mode in which the at least two processors are not supplied with power;

detecting, by a power supply controller, at least one event of a certain type that requires processing by at least one of the at least two processors in response to the computer system being in the deep sleep mode;

assigning, based on configuration registers, processing of each detected event to a respective processor of the at least two processors according to the type of the detected event, wherein the configuration registers are located in an always-on domain of the computer system that remains powered during deep sleep mode, and wherein the processing of each type of event detectable by the power supply controller is pre-assigned to a respective one of the different processors;

disabling, by a wake-up circuit, the deep sleep mode after an event is detected by the power supply controller;

activating, by the wake-up circuit, a power supply of one of the at least two processors to which the processing of the detected event has been assigned according to the configuration registers in response to disabling the deep sleep mode, wherein the activation of the power supply powers on the one of the at least two processors; and processing, by the powered-on processor, the detected event.

7. The method according to claim 6, further comprising reading a configuration from the configuration registers to determine which processor of the at least two processors to wake up first in response to disabling the deep sleep mode, wherein reading the configuration is in response to simultaneous detection of multiple events by the power supply controller.

8. The method according to claim 6, further comprising:

initializing, by the one of the at least two processors that is powered on by the activation of the power supply, the computer system.

9. The method according to claim 8, further comprising:

authorizing, by the one of the at least two processors that is powered on and initializes the computer system, activation of a power supply for each of the other processors of the at least two processors after initializing the computer system.

10. The computer system according to claim 1, wherein the at least two processors comprise:

a main processor configured to execute a non-real time operating system; and an auxiliary processor configured to execute a real-time operating system.

11. The computer system according to claim 1, further comprising:

a power control domain configured to be powered constantly; and a computing domain configured to be selectively powered, wherein the power supply controller is included in the power control domain, and wherein the at least two processors are included in the computing domain.

12. The computer system according to claim 1, wherein: the power supply controller is configured to generate a first signal indicating detection of an event for a first processor of the at least two processors and a second signal indicating detection of an event for a second processor of the at least two processors; and the wake-up circuit is configured to generate a third signal to wake up the first processor in response to the first signal and a fourth signal to wake up the second processor in response to the second signal.

13. The method according to claim 6, wherein the at least one event comprises an interrupt request.

14. The method according to claim 6, wherein initializing the computer system comprises initializing the computer system in terms of security and clocks.

15. A method for managing wake-up events in a computer system with at least two processors, the method comprising:

configuring wake-up event sources to be assigned to different processors of the at least two processors;

storing a wake-up policy in an always-on domain of the computer system, the wake-up policy defining processor selection criteria for simultaneous wake-up events;

detecting simultaneous wake-up events while the computer system is in a deep low power state where the at least two processors are not supplied with power;

determining, based on the stored wake-up policy and the detected simultaneous wake-up events, which processor of the at least two processors to wake up first;

activating a power supply for the determined processor; and booting the determined processor before any other processor of the at least two processors.

16. The method according to claim 15, wherein the at least two processors comprise:

a main processor configured to execute a non-real time operating system; and an auxiliary processor configured to execute a real-time operating system.

17. The method according to claim 16, wherein the deep low power state comprises a state in which both the main processor and the auxiliary processor are not supplied with power.

18. The method according to claim 15, wherein the wake-up event sources comprise external and internal wake-up event sources.

19. The method according to claim 15, further comprising:

in response to detecting simultaneous wake-up events assigned to different processors, selecting one of the at least two processors to wake up first based on the stored wake-up policy.

20. The method according to claim 15, wherein the wake-up event comprises an interrupt request.

* * * * *